United States Patent [19]

Johnson

[11] 4,054,246
[45] Oct. 18, 1977

[54] BUILDING STRUCTURE FOR SOLAR ENERGY RECOVERY AND UTILIZATION

[76] Inventor: Arthur F. Johnson, 203 Creole Lane, Franklin Lakes, N.J. 07417

[21] Appl. No.: 742,798

[22] Filed: Nov. 18, 1976

Related U.S. Application Data

[63] Continuation of Ser. No. 551,075, Feb. 20, 1975, abandoned.

[51] Int. Cl.$^2$ ............................................. F24J 3/02
[52] U.S. Cl. .................................. 237/1 A; 126/270; 126/400
[58] Field of Search ................ 98/31; 126/400, 270, 126/271; 62/437, 260; 237/1 A; 165/45; 34/93

[56] References Cited

U.S. PATENT DOCUMENTS

| | | | |
|---|---|---|---|
| 2,559,869 | 7/1951 | Gay | 126/270 X |
| 2,998,006 | 8/1961 | Johnston | 126/271 |
| 3,236,294 | 2/1966 | Thomason | 126/271 X |
| 3,965,972 | 6/1976 | Peterson | 165/45 |
| 4,006,856 | 2/1977 | Nilsson | 98/31 X |
| 4,010,731 | 3/1977 | Harrison | 126/400 X |
| 4,016,861 | 4/1977 | Taylor | 126/400 X |

Primary Examiner—William E. Wayner
Assistant Examiner—William E. Tapolcai, Jr.

[57] ABSTRACT

A double-walled structure utilizes air as the heat transfer medium between solar-heated outer walls and either the interior space or heat storage means beneath the structure. A load-bearing layer of gravel supporting the floor and subterranean gravel pits form the heat storage means. In summer, during the day, solar-heated air gives up heat to the storage means; at night, heat is radiated to the atmosphere and thus-cooled air is used for daytime cooling by storage either in the gravel pits or in the gravel layer supporting the building floor. In winter, air is heated in the storage means for interior circulation and, when available during daylight hours, solar-heated air may be used directly or temporarily stored for nightime use. Cold can also be stored during winter months in separate storage means for additional summer cooling capacity.

21 Claims, 4 Drawing Figures

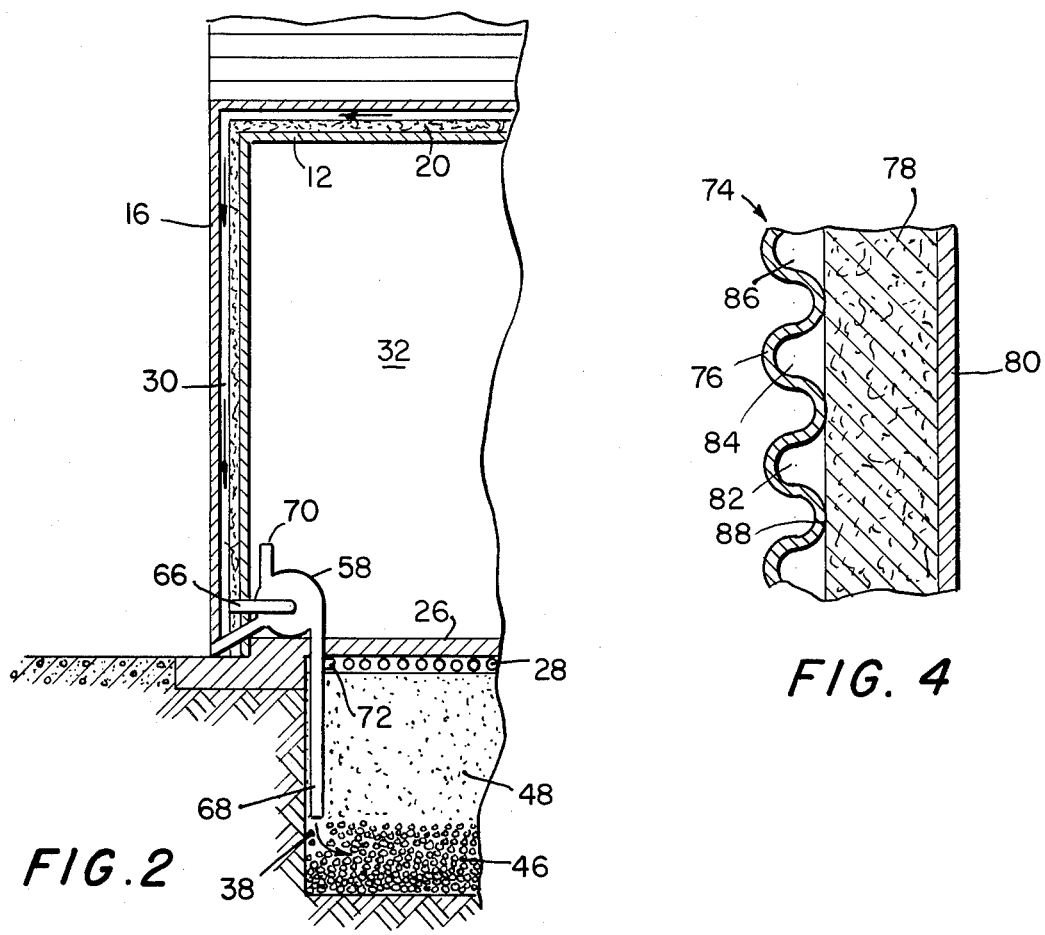
FIG. 2
FIG. 4
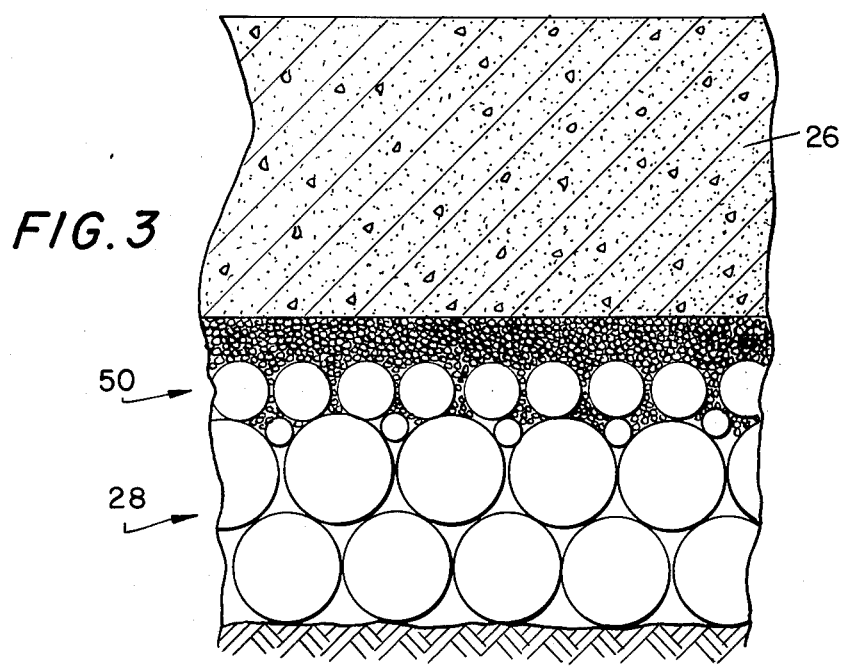
FIG. 3

BUILDING STRUCTURE FOR SOLAR ENERGY RECOVERY AND UTILIZATION

This is a continuation of application Ser. No. 551,075, filed Feb. 20, 1975, now abandoned.

BACKGROUND OF THE INVENTION

1. Field of the Invention

The present invention relates generally to solar energy recovery and utilization and, more particularly, it relates to a novel foundation and building structure in which, for a relatively modest increase in construction cost, substantially all heating/cooling requirements can be supplied by solar energy, at least in most temperate zone climates.

Solar energy collectors proposed and/or built to date to meet household or industrial heating requirements generally use water or other liquids as the heat transfer medium, the water circulating through specially-designed, roof-mounted glass-covered collector panels, with the heat being stored in large, insulated tanks at or below ground level. Coils within the tank circulate a second heat transfer fluid for interior heating purposes.

While mass production of a standarized collector panel of the type described may ultimately make the capital cost of such systems reasonable, this appears to be many years away.

Other than noting the obvious expedient of providing good insulation for energy conservation, such systems are proposed for essentially conventional structures. Further, insofar as is known such systems are proposed only to meet heating requirements, and ignore the available energy potential for meeting cooling requirements as well. In many sections of the United States, energy expended on cooling exceeds that used for heating and it is these same locations, obviously enough, where available solar energy is greatest.

Solar powered electrical generators of the semiconductor type are now reasonably efficient, but their cost is at present prohibitive.

2. Prior Art

Understanding of the present invention will be facilitated by brief consideration of some of the prior art systems proposed heretofore, including their advantages and disadvantages.

U.S. Pat. No. 2,342,211 of Newton discloses using a heating coil filled with a liquid and insulated from a sloping roof to collect or radiate heat. The liquid (and energy therein) is stored in the attic and transmitted to the air inside the building by radiators of a conventional nature.

U.S. Pat. No. 2,484,127 of Stelzer discloses using a plate of glass over a sloping roof to collect or radiate heat which is recirculated via air ducts to refractory bricks or tile arranged in a vertically inclined mass to effect thermal convection as an aid to recirculation.

U.S. Pat. No. 2,650,565 of Lof collects solar energy in a glass covered heat trap comprising partially opaque glass plates and moves this energy by heating air to a heat storage bin containing a loose or spaced solid such as sand, gravel or stacked brick, or a fluid such as tar, oil, water or the like.

U.S. Pat. No. 3,412,728 of Thomason utilizes a solar heat collector having a sloping metal roof spaced from a transparent cover thereover, with air circulating upwardly between the roof and cover to carry heat to the side of the building and downward to heat storage means comprising building blocks on which are supported a gravel layer.

More recently, Falbel, in U.S. Pat. No. 3,841,302, proposes a building attic having a moveable wall and interior reflective surfaces so that solar energy is concentrated on a relatively small collector, which can be of the heat transfer fluid or solar-cell type.

These systems must all be considered labor and capital-intensive in the first (i.e. construction) instance. Systems employing transparent surfaces and/or liquid piping must also be considered to have significant added upkeep costs, due to normal weathering, material failure etc. Perhaps even more important, the prior art systems depend either on substantial temperature differentials (sometimes referred to as $\Delta T$) for heat transfer over a limited surface area, or concentration of solar energy values prior to performance of any heating function. As will become clear from the description of the present invention, both economy and efficiency are realized by maximizing surface areas for both collection and storage of heat, while minimizing required $\Delta T$.

OBJECTS OF THE INVENTION

It is the general object of the present invention to provide an improved system for recovery and utilization of solar energy.

Another object of the present invention is to provide an economic structure that may be heated and cooled simply and efficiently with solar energy.

Another object of the present invention is to provide a novel structure which maximizes efficient heat transfer and storage in a solar-energy system with minimum added construction cost.

Another object of the present invention is to provide an improved solar energy recovery and utilization system adaptable to a variety of building structures and locations.

Various other objects and advantages of the invention will become clear from the following description of embodiments of the same, and the novel features will be particularly pointed out in connection with the appended claims.

THE DRAWINGS

Reference will hereinafter be made to the annexed drawings, wherein:

FIG. 2 is a partial cross-section taken along line II—II of FIG. 1;

FIG. 3 is a partial cross-section of the floor of the building of FIGS. 1 and 2, showing details of sub-floor construction; and FIG. 4 is a partial cross-section view of modular exterior wall panels of the type preferred for use in the present invention.

SUMMARY OF THE INVENTION

Figure 1:
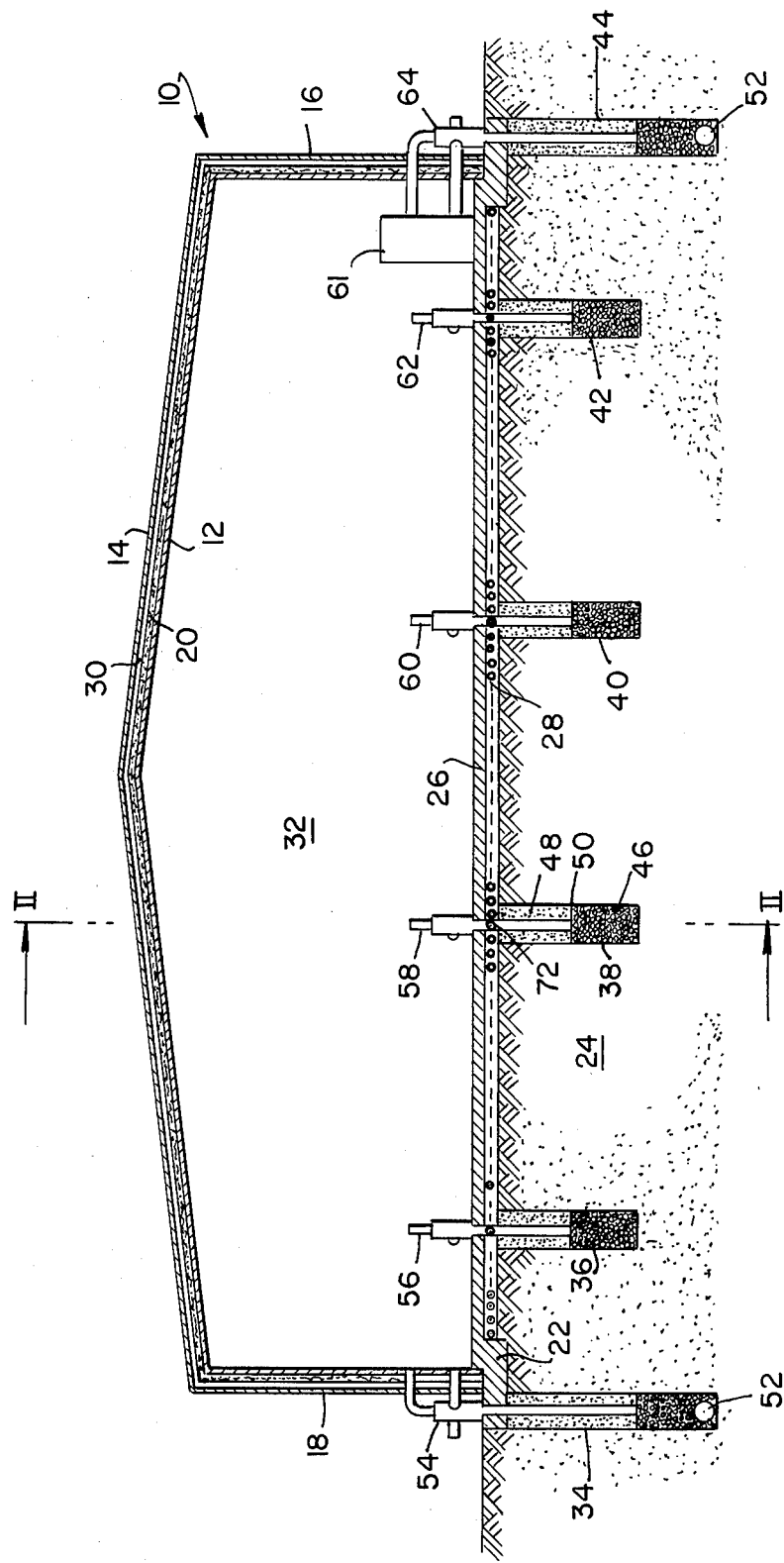
FIG. 1 is a vertical cross-section of a warehouse-type building showing an embodiment of the invention.

The present invention is based, in one part, upon the circulation of air between inner, insulated and substantially conventional walls and roof of a structure, and a closely-spaced outer skin of sheet metal, preferably dark-colored to increase energy absorption-radiation properties. In another part, the invention is based on the use of sized and washed rock or gravel in subterranean pits or trenches, advantageously located beneath the building, for the storage of heat/cold (sometimes collectively referred to as "thermal values"). In essence, the present invention uses the outer sheet building skin as an energy absorber and radiator, it uses the gravel pits and trenches as heat sinks for thermal values, and it utilizes air, available in unlimited quantity and at no cost, as the heat transfer fluid.

In another aspect, the present invention is based on the fact that at even moderate subterranean depths of a few feet, earth temperature is remarkably stable in a temperate climate; at 20 feet it is estimated at 50° F. with seasonal variations causing only a small ± ° F. change. This makes the earth a very desirable environment for a sink for storage of thermal values.

In still another aspect, the present invention is based on the ability of a radiating body to become cooler than the ambient air. More particularly, because of the fourth-power dependence of the Stefan-Boltzmann law on the absolute temperature, and because of so-called "thermal windows" in the atmosphere particularly in the range of 8 to 13.5μ which allow a body to radiate through the atmosphere, the surface of the radiating body in air may cool as much as 15° F. below the ambient. Of course, convective heat exchange (i.e. wind) will mitigate against such cooling, but in the present invention this aspect of the invention is utilized during night and early morning hours of summer, when microclimate convection is minimal.

On a summer day, air is heated by the skin and then gives up much of this heat to the sink prior to being exhausted. On a summer night, building air or air circulated through a sub-floor gravel layer gives up heat through the skin, to cool the building air, sub-floor gravel layer or both. In certain instances a separate cold sink, cooled during winter months, can be drawn upon for additional cooling capacity.

During winter, heating is provided by solar energy absorbed by the skin when available, supplemented by heat from the sinks as required. During winter nights, air between the wall and skin is cooled and used to charge a cold sink if present, or merely as extra insulation if not.

It has been determined that metal roofing or siding, when exposed to the sun, may be heated as much as 50° F. or even higher than the ambient air temperature. This heating is enhanced if the metal has a dark, radiation-absorbing color. Of course, such heating will not be as great under significant wind conditions (i.e. wind chill factor). However, by using ordinary metal siding rather than elaborate glass panels, significant economies are achieved.

In accordance with a preferred embodiment of the invention, two types of heat storage means are employed. For long term storage (up to several months) subterranean pits or trenches filled with size-graded and washed rock or gravel are employed. For the shorter term (a few days to a few weeks), a load-bearing gravel layer immediately beneath the building floor is provided.

Heat storage or cold storage needed from day to day or for a few weeks is stored in the floor and gravel layer immediately under the floor at temperature potentials which may be only 10° F. different from building air temperatures, which desirably range from about 60° to 70° F. Thus, on a clear winter day with an outside still air temperature of 40° F., the metal roof may be heated to 70° F. or higher for a number of hours as air is circulated under the roof. The heated air is passed through the load-bearing, sized and washed gravel under the floor. It heats the floor directly and provides a heat source for maintaining building air temperature at night. Similarly on a clear summer night when air temperature outside is 80° F., a metal roof radiating to outer space may drop as low as 65° F. even when some air is circulating beneath it carrying the cooled air to cold storage in the load-bearing gravel under the floor.

To utilize the earth under a building as a heat storage medium sufficient to provide heat in the winter months in a temperate zone climate, trenches beneath the concrete floor should have a depth of 10 feet or more at spaced intervals, so that the earth between may be gradually heated during the late summer and fall months, finally as high as 90° F. or more. Sized and washed coarse gravel allows air to travel through but by circuitous routes so heat is transferred quickly to the gravel by convection, and to the earth by conduction and radiation, but much more slowly. Heat stored in this manner is drawn upon in winter and early spring months.

DESCRIPTION OF EMBODIMENTS

The invention will be described with reference to a simple structure of a type that is commonly used for warehouses, shopping centers, schools and manufacturing, but it will be appreciated that it is not so limited.

Referring to FIG. 1, a building 10 has steel framework 12 to which are attached sheet steel roof 14, sides 16 and 18 and ends (not shown). Heat insulation 20 having a U-factor of about 0.05 is spaced an average of about ⅜ of an inch or less from the metal roof 14 and sides 16 and 18 to allow air to circulate and either be heated by solar radiation during the day (during the fall, winter and early spring months) or be cooled by radiation into space at night in the hot summer months to keep the building space at a temperature of 65°-75° F. The concrete footing 22 supports the steel structure on the earth 24 and the concrete floor 26 is also supported on the earth 24, but with a load-bearing layer of coarse-sized and washed gravel 28 intervening and through the pore spaces of which the air (heated or cooled in the space 30 between insulation 20 and walls 14, 16, 18) is horizontally circulated to heat or cool the gravel and the floor 26. Hence, the building space 32 is cooled more quickly by circulating air horizontally under the floor and storing heat or cold there. To provide enough heat storage so that the building can be kept warm all winter, spaced trenches 34, 36, 38, 40, 42 and 44 are dug before the building is constructed and filled with gravel 46 excepting for the top several feet where sand 48 is used as a load-bearing heat insulation to keep the hot air (circulated through trench bottoms) from overheating the floor to uncomfortable temperatures in the fall months when the heat is accumulated in the earth. The sand is not only load-bearing and prevents air flow but has lower heat conductivity than solid earth.

Between the gravel 46 and sand 48, as well as between gravel 28 and floor 26, a transition zone 50 of intermediate sized particles is provided, as is more clearly shown in FIG. 3. The topmost layer in zone 50 for example, may be coarse sand which will form an impermeable base for concrete 26. Below this, −⅜ inch gravel fills the pore spaces on top of the +⅜ inch layer of gravel 28 and provides a base for the sand.

To drain any water from the area covered by the building, sand is also used in the upper part of the trenches 34 and 44, and sized, coarse, +⅜ inch gravel is used in the lower part, but a tile 52 collects and drains off any rainfall or seepage.

Gravel used in trenches and under the floor is +⅜ inch by 2 inches, except as noted above, and initially washed to minimize dusting problems; for further protection from dust and moisture it is preferred that a plastic, such as polyethylene, or a thin gunite-type layer of concrete (not shown), be used to line the trench or underfloor area.

Air can be circulated through the space 30 between metal walls or roof and insulation, and thence either through the gravel 28 supporting floor 26 for relatively short-term air conditioning needs, or through the load-bearing gravel 46 in the trenches 36, 38, 40 and 42 so the earth at greater depth can be heated to the elevated temperatures, as set forth in the example of Tables I and II below. Table II shows the earth temperatures at each level of depth and Btu's of energy stored in the earth. Table I shows a heat balance which can be achieved by storing heat during the summer months and utilizing it in the winter months to offset all heat losses from the warehouse building to the outside air as well as into the earth, which is taken to have a heat sink temperature of 50° F. in the first 40 feet.

The mechanics by which the warehouse type of building is heated and cooled as desired throughout the year depends on proper utilization of fans or blowers 54 through 64. For example, during hot summer days blower 58 (FIG. 2) on the south end of the warehouse draws in at valve 66 hot air from the narrow space 30 (between outside metal end wall and roof and interior heat insulation) and discharges it via valve 68 into the bottom of trench 38 through which the hot air flows horizontally to the north end of the building (not shown) where a similar fan picks it up and recirculates it through the narrow spaces 30 via the north end wall and into the longitudinal length of the roof which it tends to cool as it delivers heat to the earth, raising this air from its normal 50° F. average temperature to the temperature of the warehouse roof. Near noon of a day when ambient air temperature is 70° F., roof temperature may reach 120° F. without air being circulated, or perhaps 85° to 90° F. with limited air circulation, so it is feasible to heat the earth to 80° or 90° F. or more, if desired, by recirculating air in this manner in a dispersed system embracing the areas of roof, walls and floor. That is, the entire are of the roof is used to collect the heat in the summer and the entire area of the floor is used to heat the building during the winter by upward radiation, and minor convection and conduction from floor to warehouse air. When required, additional heat is provided by drawing warm air from gravel 46 of trench 38 through valve 68 of blower 58 (FIG. 2) and discharging it into the enclosed warehouse space through valve 70 in the south end of the building. In the north end (not shown), air is drawn from the building with a similar blower and discharged back into the sized gravel. In the blower operations described above, the direction of the air should be reversed from time to time to maintain earth heat-storage at both ends of the building always at the maximum temperature, because the ends and sides of any building are naturally more difficult to keep warm or cool due to heat losses from the sides as well as the roof. Preferably, the warehouse building is heated through the floor by upward radiation to it from heat storage in the earth. Radiated floor heat is always preferred since the floor level is where people are working and need to be made comfortable. Heating the building airspace higher than that of the floor during the winter only results in excessive heat losses through the roof, since heated air rises and forms a warm layer in the ceiling.

A single blower and single trench inside the building may be used instead of several as shown in FIG. 1, but using several gives security in case one or more blowers must be shut down for repairs, or to cope with extreme cold spells. It will be noted that this invention practically insures that a building space will never be exposed to temperature lower than earth-sink temperature, which is usually about the same as the average annual ambient temperature at that locality. The examples used herein in Tables I to III show 50° F. as the heat sink temperature, and with moderate heat storage being made in the summer, heat withdrawn by conduits or trenches in the earth will keep a well insulated building from falling much, if any, below 50° F. during the most extreme cold spell.

Table III shows that the recovery of only a few percent (average 2.7%) of the solar energy falling on the roof and storage in the earth will make unnecessary any large heat storage such as illustrated in Table I and II. Just what percent of solar energy can be recovered on a horizontal or slightly sloping roof depends on a great many factors, including cloud cover, wind direction and velocity, as well as outside temperature and inside temperature. When a roof is shielded from outside air by glass, a recovery of perhaps 50-60% might be expected. However, since glass absorbs solar energy and dissipates it to the outside air or reflects it to outer space in amounts totaling 10-30%, not using glass has some theoretical and economic advantages. Consequently, solar make-up heat as shown in Table III can supply all the heat needed in the temperate zone excepting for week to week storage during cold spells, in all months excepting January and December when storage of heat in the earth sufficient to last 2 months may be necessary for absolute safety in maintaining a 60° F. warehouse temperature. That is, only half as many trenches and half as deep compared to those shown in FIGS. 1 and 2 may actually be required in temperate climates. Of course, soils vary widely in heat conductivity and heat capacity, depending on density and composition, and this must also be taken into account, as must variations in cloud cover, rainfall, wind factors, etc. Considering the relatively low cost of extra installed heat storage capacity, a degree of "over-engineering" is to be preferred.

To provide cold-storage for air cooling on the hot days of the summer, while heat is being stored relatively deep in the earth near the bottom of the trenches during the day, the floor and air of the building may be cooled by withdrawing night air from the thin spaces 30 (between metal roof and walls and their heat insulation) down through valve 66 of blower 58 (FIG. 2) and forcing it via valve 72 horizontally through the sized gravel layer supporting the floor to the south end of the building. There, a similar blower withdraws it from under the floor and forces it back into the space 30 in the roof for recooling by radiation (see FIG. 3 and Table IV). After the floor is cooled, the blower 58 may withdraw the air from thin space 30 via valve 66 (FIG. 2) and discharge it into the building space via valve 70.

Where the structure of FIGS. 1, 2 and 3 houses an industrial manufacturing building or power plant, the heat generated within the building will quite often be more than sufficient to heat it since furnaces 61 are used to produce process steam or generate power. Under these circumstances the present invention may be used to recuperate heat being wasted and preheat the air used for combustion. The gravel-filled trenches in this case are located outside the building, as shown by 34 and 44 of FIG. 1, and these trenches are sized to effectively recover the heat in the waste gases together with unwanted air polutants. It will be found that the latter will be substantially condensed or entrapped by the surface of the gravel granules. From time to time the gravel may be washed with water or a cleansing solution so as to wash the gravel free of fly ash or flue dust which tends to fill the pore spaces between gravel particles. This will be drawn off in the tile lines 52 beneath the trenches. The effluent furnace gases are discharged to the atmosphere through a stack after the heat and air polutants are removed in a long, gravel-filled trench 34. From time to time, when the gravel in trench 34 at the discharge end of the stack gases becomes heated above atmospheric temperature, the hot gases are switched by the fans and dampers illustrated in the drawings to trench 44; and simultaneously air needed for a fossil-fuel fired furnace is drawn through trench 34 counter-current to the prior flow of the stack gases when these were used to heat the gravel in the trench.

Since the weight of the stack gas will exceed that of the air needed for combusion by the weight of fossil fuel components gasified during combustion, the recuperator may recover up to about 80% of the heat now being lost where no heat-exchangers or recuperators are used. The same process may be used to recuperate heat in homes or business buildings or schools or any type of buildings heated by fossil-fuel fired furnaces. In accordance with the invention, fuel economies may be achieved by preheating the ambient air needed for fuel combustion in gravel-filled trenches from just the warmth of the earth, when earth temperature exceeds ambient temperature, which it usually does during the nights and during the winter. Gravel-filled trenches below 10 or 20 feet are heated by natural heat which may be augmented by the heat from ambient air drawn through the gravel during warm days and warm hours of a day when air temperature is higher than earth temperature. The heat in ambient air that can be stored in a gravel recuperator of the general design herein revealed is limited only by the size of the trenches containing the gravel and the fans used to circulate the gases.

The same principles may be applied to residential buildings to increase efficiency of fuel utilization by the drawing warm ambient air through a gravel filled trench to heat the gravel during the day, when no furnace heat is required, and thereafter during the nightime hours drawing cooler night air through the same gravel bed and supplying this preheated air to the furnace. In an existing building, the gravel-filled trenches can be built outside but adjacent the structure, and installing a fan or blower to draw air needed for combustion through the trenches.

To carry out the invention with greatest economy, it is preferred that modular, insulated wall panels having "built-in" means for circulating air beneath the skin be employed. There are insulation-filled wall panels currently on the market, but they tend to twist out of shape and to come apart under thermal cycling and the consequent expansion and contraction. Because of expansion-contraction problems, the size of such panels has been significantly limited. A partial cross-section of a modular wall panel for use in the present invention is illustrated in FIG. 4 and attention is directed thereto. The panel 74 comprises a corrugated outer wall 76, a layer or sheet of heat insulating material 78, such as polyurethane, fiberglass or other material having a low U-factor, and an interior wall 80 of any suitable and attractive design. The corrugations of outer wall 76 define air spaces 82, 84, 86 etc. which are connected at opposite ends to adjoining panels so as to form parallel air paths through the panels. This is done by merely altering the die or roll used to form the panel. The air "exit" from one panel will, upon installation, align with the air "entrance" of an adjacent panel, and a simple fitting is employed to join the paths.

In constructing the panel 74, a layer of sealant 88 is employed to rigidly secure outer wall 76 and insulation 78. This may be a mineral cement, an organic material or other suitable material. Because air will be circulating through spaces 82, 84 etc. the thermal stressing will be substantially less than in conventional panels. This enables panels 74 to be built in substantially larger sizes than conventional panels.

Understanding of the invention and the foregoing description will be facilitated by reference to the following Tables I–IV, hereinbefore referred to.

TABLE I

| EXAMPLE OF HEAT BALANCE IN WAREHOUSE KEPT AT 60 DEGREES F. | | | | | | | | | | | | | |
|---|---|---|---|---|---|---|---|---|---|---|---|---|---|
| | Jan. | Feb. | Mar. | April | May | June | July | Aug. | Sept. | Oct. | Nov. | Dec. | Total Year |
| DEGREE DAYS BELOW 60 F. | 913 | 766 | 677 | 155 | 105 | | | | | 233 | 604 | 824 | 4277 |
| Btu loss/sq.ft. floor to outside air at U=0.05 | 1096 | 919 | 812 | 186 | 126 | | | | | 280 | 725 | 989 | 5133 |
| Btu loss/sq.ft. floor into earth at 1 degree F. per ft. depth temp. gradient & k=0.5 Btu/ft.$^2$/ft. | 372 | 339 | 372 | 360 | 372 | 360 | 372 | 372 | 360 | 372 | 360 | 372 | 4383 |
| Total heat losses | 1468 | 1258 | 1184 | 546 | 498 | 360 | 372 | 372 | 360 | 652 | 1085 | 1361 | 9516 |
| Cumulative losses beginning with June | 6030 | 7288 | 8472 | 9018 | 9516 | 360 | 732 | 1104 | 1464 | 2116 | 3201 | 4562 | |
| DEGREE DAYS ABOVE 60 F. | | | | | 2 | 138 | 199 | 270 | 21 | 1 | | | 631 |
| Btu into and from heat storage in earth from ambient air circulated at rate of 60$^3$ ft.hr./ft.$^2$ of floor (at 0.2 sp.ht. & 0.08 lbs./ft. weight of air & 65.45% efficiency heat transfer=15.08 Btu/degree day) | | | | | 30 | 2081 | 3001 | 4072 | 317 | 15 | | | 9516 |
| Cumulative heat stored and recovered | 9516 | 9516 | 9516 | 9516 | 9516 | 2111 | 5112 | 9184 | 9501 | 9516 | 9516 | 9516 | |
| Excess of heat recovered over heat lost (Btu/ft.$^2$ | 3486 | 2228 | 1044 | 498 | 0 | 1721 | 4380 | 8080 | 8037 | 7400 | 6315 | 4954 | |

TABLE I-continued
EXAMPLE OF HEAT BALANCE IN WAREHOUSE KEPT AT 60 DEGREES F.

| | Jan. | Feb. | Mar. | April | May | June | July | Aug. | Sept. | Oct. | Nov. | Dec. | Total Year |
|---|---|---|---|---|---|---|---|---|---|---|---|---|---|
| DEGREE DAYS BELOW 60 F. per month | 913 | 766 | 677 | 155 | 105 | | | | | 233 | 604 | 824 | 4277 |

TABLE II
ESTIMATE OF TEMPERATURE (deg.F) in EARTH STORAGE OF TABLE I

| | | JAN. | FEB. | MAR. | APRIL | MAY | JUNE | JULY | AUG. | SEPT. | OCT. | NOV. | DEC. |
|---|---|---|---|---|---|---|---|---|---|---|---|---|---|
| | FLOOR | 71 | 69 | 67 | 65 | 64 | 65 | 67 | 70 | 72 | 73 | 74 | 73 |
| FEET BELOW | 5 | 71 | 69 | 67 | 65 | 64 | 65 | 67 | 72 | 76 | 76 | 75 | 73 |
| SURFACE | 10 | 76 | 74 | 72 | 70 | 69 | 70 | 72 | 77 | 81 | 81 | 80 | 78 |
| | 15 | 71 | 69 | 67 | 65 | 64 | 65 | 67 | 72 | 76 | 76 | 75 | 73 |
| | 20 | 66 | 64 | 62 | 60 | 59 | 60 | 62 | 67 | 71 | 71 | 70 | 68 |
| | 25 | 61 | 59 | 57 | 55 | 54 | 55 | 57 | 62 | 66 | 66 | 65 | 63 |
| | 30 | 56 | 54 | 50 | 50 | 50 | 51 | 52 | 57 | 61 | 61 | 61 | 58 |
| | 35 | 50 | 50 | | | | | | 51 | 56 | 56 | 55 | 53 |
| | 40 | | | | | | | | | | 50 | 50 | 50 |

ASSUMPTIONS
(1) A temperature gradient of 1 degree Fahrenheit is maintained per foot of depth of dry earth which is used as heat storage
(2) The heat conductivity of the earth is assumed to be 0.5 Btu per sq. ft. per deg. F. drop per ft. of depth, the density 120 lbs. per cubic foot and the specific heat 0.2.
(3) The concrete floor is assumed to be 0.5 ft. thick, weight 135 pounds per cubic foot and have a specific heat of 0.156.

| CALCULATED Btu STORED IN FLOOR | JAN. | FEB. | MAR. | APRIL | MAY | JUNE | JULY | AUG. | SEPT. | OCT. | NOV. | DEC. |
|---|---|---|---|---|---|---|---|---|---|---|---|---|
| STORED 0-5 ft. earth | 116 | 95 | 74 | 53 | 42 | 53 | 74 | 105 | 126 | 137 | 147 | 137 |
| 6-10 | 1320 | 1080 | 840 | 720 | 480 | 600 | 840 | 1320 | 1680 | 1740 | 1740 | 1560 |
| 11-15 | 1620 | 1380 | 1020 | 900 | 780 | 900 | 1020 | 1740 | 2220 | 2220 | 2100 | 1860 |
| 16-20 | 1620 | 1380 | 1020 | 900 | 780 | 900 | 1020 | 1740 | 2220 | 2220 | 2100 | 1860 |
| 21-25 | 1020 | 780 | 540 | 300 | 180 | 300 | 540 | 180 | 1620 | 1620 | 1500 | 1260 |
| 26-30 | 420 | 180 | | | | | | 540 | 1020 | 1020 | 300 | 660 |
| 31-35 | | | | | | | | | | 420 | 420 | 300 | 60 |
| 36-40 | | | | | | | | | | | | | |
| Available to heat Bldg. Btu stored above 60 F. | 6116 | 4895 | 3494 | 2873 | 2262 | 2753 | 3493 | 5625 | 9306 | 9377 | 8187 | 7397 |
| Btu stored 50-60 F. Available to supply losses of heat conducted into earth | 7845 | 7365 | 6465 | 6105 | 5925 | 6045 | 6705 | 7065 | 8385 | 8805 | 8322 | 7845 |

TABLE III
EXAMPLE OF SOLAR HEAT RECOVERY NEEDED ON FLAT ROOF TO OFFSET HEAT LOSSES

| | JAN. | FEB. | MAR. | APRIL | MAY | JUNE | JULY | AUG. | SEPT. | OCT. | NOV. | DEC. |
|---|---|---|---|---|---|---|---|---|---|---|---|---|
| A ESTIMATED Btu's (in thousands ") SOLAR HEAT/Sq.Ft. ROOF OF BUILDING | 23.1 | 28.0 | 45.9 | 51.0 | 52.7 | 58.2 | 59.5 | 50.2 | 45.6 | 36.9 | 25.4 | 20.8 |
| B TOTAL Btu Lost (in thousands) FROM WAREHOUSE of TABLE I | 1.5 | 1.3 | 1.2 | 0.5 | 0.5 | 0.4 | 0.4 | 0.4 | 0.4 | 0.7 | 1.1 | 1.4 |
| C % RECOVERY OF SOLAR HEAT TO OFFSET LOSSES = B/A = C | 6.4 | 4.5 | 2.6 | 1.1 | 0.9 | 0.6 | 0.6 | 0.7 | 0.8 | 1.8 | 4.3 | 6.6 |

TABLE IV
TESTS ON GRAVEL SIZES TO DETERMINE SUITABILITY FOR HEAT STORAGE

| | $-1\frac{1}{2}''+\frac{3}{4}''$ | $-\frac{3}{4}''+\frac{3}{8}''$ | $-\frac{3}{8}''$ |
|---|---|---|---|
| WEIGHT PER CUBIC FOOT OF GRAVEL (lbs.) | 86 | 90 | 105 |
| PERCENT PORE SPACE | 39 | 37 | 33 |
| PRESSURE DROP PER 100 Ft. LENGTH PER 100 Cu.Ft. AIR PER MINUTE FLOW THRU Sq.Ft. GRAVEL (inches/water) | 6.3 | 11 | 450 |
| WEIGHT PER CUBIC FOOT OF SOLID ROCK OF WHICH GRAVEL DERIVED | 141 | 146 | 151 |
| (A) COLD STORAGE CAPACITY OF ONE CUBIC FOOT OF GRAVEL 30° F. COOLER THAN OUTSIDE AIR at 0.2 specific heat for gravel (Btu) | 516 | 540 | 627 |
| (B) COLD STORAGE CAPACITY OF ONE HALF CUBIC FOOT OF CONCRETE FLOOR 30° F. COOLER THAN OUTSIDE AIR at 135 lbs./cu.ft. and 0.2 | | | |

TABLE IV-continued
TESTS ON GRAVEL SIZES TO DETERMINE SUITABILITY FOR HEAT STORAGE

| | | $-1\frac{1}{2}''+\frac{3}{4}''$ | $-\frac{3}{4}''+\frac{3}{8}''$ | $-\frac{3}{8}''$ |
|---|---|---|---|---|
| specific heat | (Btu) | 316 | 316 | 316 |
| (C) TOTAL STORAGE CAPACITY OF FLOOR AND THE GRAVEL WHICH SUPPORTS IT UPON THE EARTH, per ft² | (Btu) | 832 | 856 | 932 |
| (D) HEAT LOSS OF BUILDING PER sq. ft. FLOOR PER 24 HOURS at 85° F. OUTSIDE TEMPERATURE AND 65° F. INSIDE WITH U-factor of 0.05 Per sq. ft. FLOOR | (Btu) | 18 | 18 | 18 |
| (E) DAYS OF COLD STORAGE AVAILABLE FOR COOLING BUILDING at 70% RECOVERY EFFICIENCY FROM STORAGE (E=C/D) | | 32 | 33 | 36 |

In summary, the essence of the invention is the discovery that the ambient air available in unlimited quantities can be used during the hottest hours of a year to store heat in the dry earth beneath a building. Such hot air is circulated horizontally through the pore spaces in sized, coarse gravel whose ability to bear load makes possible filling trenches or other passages under the building. The quickly heated gravel particles transmit their heat more gradually into the adjoining earth. The roof and the wall of the building are well insulated, so that the overall heat loss per square foot of enclosed floorspace does not total more than 0.05 Btu/sq. ft./hour/degree F. temperature difference between the enclosed air and the ambient air. Under such conditions the heat stored in summer months in the earth beneath a large building will be generally sufficient to maintain it at comfortable temperatures the rest of the year. The heat storage capacity is replenished on any unusually warm day, summer or winter, by heating ambient air even hotter in the small spaces between the outside walls and the heat insulation backing these. On uncomfortably hot days in the summer months, air in the building is cooled by recirculating it through gravel-filled passages deep enough in the earth to be cooler (i.e. 50%F.) than the building interior. This cooling effect is enhanced by circulating building air at night through the thin spaces under the roof, which radiate heat to outer space and cool building air to a temperature lower than the ambient night air.

Control of temperature in buildings employing the invention can be carried out in several ways, depending on size of the structure and the desired degree of automation. For "manual" operation, all the instrumentation required would be thermometers located within and outside of the building and in the heat sinks; an operator would then manually operate valves and blowers as required. At the other end of the scale would be completely automated operation controlled by a small computer. The computer's program would include desired interior temperatures for each hour of the day and night, and a tolerance factor. A clock input would tell the time to the computer, and a substantial number of thermal sensors would continuously monitor temperatures inside and outside the building, at each end of the heat sinks, and in the thin spaces between the walls. With these inputs, the computer would select the optimum pattern of air flow in the thin spaces, through the heat sinks and the building interior, and actuate valves and blowers accordingly. The computer program could be tailored to the particular locality of the building, and the local climate, to maximize long-term storage of either heat or cold. Additionally, the computer could control auxiliary heating means on such occasions when the heating load is too great for the storage means of the invention.

Intermediate a manual and fully automated system, control of the system can be provided with a simple clock-controlled circuitry 90, with or without temperature sensors 92, to provide a set, daily pattern of air circulation, based on average temperatures, which is changed seasonally. A manual override 94 would allow an operator to change the pattern to meet extraordinary conditions.

Various changes in the details, steps, materials and arrangements of parts, which have been herein described and illustrated in order to explain the nature of the invention, may be made by those skilled in the art within the principle and scope of the invention as defined in the appended claims.

What is claimed is:

1. A building structure comprising:
   exterior walls and roof structure including spaced inner and outer walls and means for circulating air therebetween;
   first heat storage means comprising subterranean pits filled with gravel, air spaces between said gravel forming an air passage therethrough, said first heat storage means being located beneath or adjacent said building structure;
   second heat storage means comprising a load-bearing layer of gravel supporting the floor of said building structure, air spaces between said gravel forming an air passage therethrough;
   means for circulating air through said first and second heat storage means;
   conduit means connecting said respective circulating means and the interior space of said building structure; and
   control means governing air flow through said conduits, heat storage means and between said inner and outer walls.

2. The building structure as claimed in claim 1, wherein the outside surface of said outer wall is a dark, radiation-absorbing color.

3. The building structure as claimed in claim 1, wherein said outer walls comprise corrugated sheet metal including a dark colored radiation-absorbing outer surface, said outer walls being bonded to said inner walls and said corrugations forming passages for circulation of air.

4. The building structure as claimed in claim 3, wherein said inner walls include a layer of thermal insulation.

5. The building structure as claimed in claim 1, wherein said first heat storage means comprises a plurality of elongated trenches with air circulating means at each end thereof.

6. The building structure as claimed in claim 1, wherein said gravel particles in said first storage means are in a thinner top layer and a lower thicker layer, and average less than ⅜ inches in diameter in said top layer and larger than ⅜ inches in diameter in said lower layer.

7. The building structure as claimed in claim 1, wherein said gravel particles in said second storage means average less than ⅜ inches in diameter adjacent to and supporting said floor, and averages greater than ⅜ inches in diameter in the remainder of said second storage means.

8. The building structure as claimed in claim 1, wherein the gravel in said heat storage means has an average particle diameter in the range of ⅜ to 2 inches.

9. The building structure as claimed in claim 6, and additionally comprising a tile line to drain moisture from the lower layer of gravel in at least one of said first heat storage means.

10. A building structure comprising:
exterior walls and roof structure including spaced inner and outer walls;
heat storeage means comprising subterranean trenches filled with gravel sized to provide air spaces between said gravel and forming horizontal air passages therethrough, said gravel having an average particle diameter in the range of ⅜ to 2 inches, said heat storage means being in heat-exchange relation with the ground and located beneath or adjacent said building structure;
means for circulating air between said walls and through said heat storage means;
conduit means connecting said circulating means and the interior space of said building structure; and
control means governing air flow through said conduits, heat storage means and between said inner and outer walls.

11. The building structure as claimed in claim 10, wherein the outside surface of said outer wall is a dark, radiation-absorbing color.

12. The building structure as claimed in claim 10, wherein said outer walls comprise corrugated sheet metal including a dark colored radiation-absorbing outer surface, said outer walls being bonded to said inner walls and said corrugations forming passages for circulation of air.

13. The building structure as claimed in claim 12, wherein said inner walls include a layer of thermal insulation.

14. The building structure as claimed in claim 10, and additionally comprising a tile line to drain moisture from the lower layer of gravel in at least one of said heat storage means.

15. A building structure comprising:
exterior walls and roof structure including spaced inner and outer walls;
heat storage means comprising a load-bearing layer of sized gravel supporting the floor of said building structure, air spaces between said gravel forming an air passage therethrough and including a thinner top layer of smaller size gravel and a thicker lower layer of larger size gravel;
said heat storage means being in heat-exchange relation with said floor and the ground;
means for circulating air between said walls and laterally through said heat storage means;
conduit means connecting said circulating means and the interior space of said building structure; and
control means governing air flow through said conduits, heat exchange means and between said inner and outer walls.

16. The building structure as claimed in claim 15, wherein the outside surface of said outer wall is a dark, radiation-absorbing color.

17. The building structure as claimed in claim 15, wherein said outer walls comprise corrugated sheet metal including a dark colored radiation-absorbing outer surface, said outer walls being bonded to said inner walls and said corrugations forming passages for circulation of air.

18. The building structure as claimed in claim 17, wherein said inner walls include a layer of thermal insulation 19. The building structure as claimed in claim 15, wherein said gravel particles in said storage means average less than ⅜ inch in said top layer and average greater than ⅜ inch in diameter in said lower layer.

20. The building structure as claimed in claim 15, wherein the gravel in said heat storage means has an average particle diameter in the range of ⅜ to 2 inches.

21. A building structure comprising:
exterior walls and roof structure;
heat storage means comprising subterranean pits filled with gravel, air spaces between said gravel forming an air passage therethrough, said heat storage means being located beneath or adjacent said building structure;
fossil fuel combustion means including combustion air intake means and combustion gas exhaust means;
means for separately circulating air and combustion gas through said heat storage means;
conduit means connecting said respective circulating means and said intake and exhaust means; and
control means governing flow of air and exhaust gas through said conduits, heat storage means and said fuel combustion means, whereby heat in said combustion gas may be recuperated prior to exhaust, and air may be preheated prior to combustion.

* * * * *